(12) United States Patent
Jacobson et al.

(10) Patent No.: US 8,773,231 B2
(45) Date of Patent: Jul. 8, 2014

(54) MULTIPHASE POWER CONVERTERS INVOLVING CONTROLLABLE INDUCTORS

(75) Inventors: Boris S. Jacobson, Westford, MA (US); Edward Jung, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/416,368

(22) Filed: Mar. 9, 2012

(65) Prior Publication Data
US 2013/0234526 A1    Sep. 12, 2013

(51) Int. Cl.
*H01F 27/28* (2006.01)
*H01F 30/12* (2006.01)
*H01F 27/24* (2006.01)

(52) U.S. Cl.
USPC ............... 336/170; 336/5; 336/184; 336/212

(58) Field of Classification Search
USPC .............. 336/170, 184, 5, 212, 214, 222, 220
See application file for complete search history.

(56) References Cited

U.S. PATENT DOCUMENTS

| | | | | |
|---|---|---|---|---|
| 791,423 | A * | 5/1905 | Ihlder | 335/244 |
| 1,390,050 | A * | 9/1921 | Lee | 336/5 |
| 1,662,132 | A * | 3/1928 | Simmons | 336/171 |
| 2,387,327 | A * | 10/1945 | Holslag | 315/144 |
| 2,617,090 | A * | 11/1952 | Ogle | 323/337 |
| 3,599,037 | A | 8/1971 | Grace | |
| 3,657,678 | A * | 4/1972 | Schwenden | 336/160 |
| 4,691,270 | A | 9/1987 | Pruitt | |
| 4,855,888 | A | 8/1989 | Henze et al. | |
| 4,876,635 | A | 10/1989 | Park et al. | |
| 4,987,390 | A | 1/1991 | Mouri et al. | |
| 5,426,409 | A | 6/1995 | Johnson | |
| 5,481,238 | A | 1/1996 | Carsten et al. | |
| 5,559,688 | A | 9/1996 | Pringle | |
| 5,629,553 | A | 5/1997 | Ikeda et al. | |
| 5,784,692 | A | 7/1998 | Kleinberg | |
| 6,348,848 | B1 * | 2/2002 | Herbert | 336/178 |
| 6,429,765 | B1 * | 8/2002 | Valdemarsson et al. | 336/212 |
| 6,843,138 | B2 | 1/2005 | Pollard | |
| 6,873,138 | B2 | 3/2005 | Jacobson | |

(Continued)

OTHER PUBLICATIONS

A. Faruk Bakan, "A New LVI Assisted PSPWM DC-DC Converter," International Conference on Electrical and Electronics Engineering, 2009, ELECO 2009, pp. 1-230 to 1-233 (4 pages).

(Continued)

*Primary Examiner* — Elvin G Enad
*Assistant Examiner* — Kazi Hossain
(74) *Attorney, Agent, or Firm* — Cantor Colburn LLP

(57) ABSTRACT

A controllable inductor system includes a multiphase inductor comprising a central winding, a first control winding, and a second control winding, and a control portion comprising a first control logic portion operative to receive a signal indicative of a current of the first control winding and a signal indicative of a current of the sum of the first control winding and the second control winding and modulate a first pulse width modulated signal to responsively control a first transistor connected to the first control winding, and a second control logic portion operative to receive the signal indicative of the current of the first control winding and a signal indicative of a current of the sum of the first control winding and the second control winding and modulate a second pulse width modulated signal to responsively control a second transistor connected to the second control winding.

7 Claims, 12 Drawing Sheets

(56) References Cited

U.S. PATENT DOCUMENTS

| | | | | |
|---|---|---|---|---|
| 6,927,660 | B2* | 8/2005 | Okamoto | 336/192 |
| 7,187,263 | B2* | 3/2007 | Vinciarelli | 336/200 |
| 7,391,202 | B2 | 6/2008 | Brandt et al. | |
| 7,839,023 | B2 | 11/2010 | Jacobson et al. | |
| 2003/0198067 | A1* | 10/2003 | Sun et al. | 363/53 |
| 2005/0024179 | A1* | 2/2005 | Chandrasekaran et al. | 336/212 |
| 2012/0194313 | A1* | 8/2012 | Wohlforth | 336/170 |

OTHER PUBLICATIONS

B. Jacobson et al "Series Resonant Converter with Clamped Tank Capacitor Voltage," IEEE APEC, 1990, pp. 137-146.

J. Gallagher, "Coupled Inductors Improve Multiphase Buck Efficiency," Power Electronics Technology, Jan. 2006, pp. 36-42.

J. Gallagher, "Designing Coupled Inductors," Power Electronics Technology, Apr. 2006.

J. Marcos Alonso et al., "Investigation of a New Control Strategy for Electronic Ballasts Based on Variable Inductor," IEEE Transactions on Industrial Electronics, vol. 55, No. 1, Jan. 2008, pp. 3-10.

P-L. Wong et al "A Novel Modeling Concept for Multi-Coupling Core Structures," IEEE APEC 2001, Mar. 4-8, 2001, pp. 102-108.

S. Ben Yaakov et al., "A Self-Adjusting Sinusoidal Power Source Suitable for Driving Capacitive Loads," IEEE Transactions on Power Electronics, vol. 21, No. 4, Jul. 2006, pp. 890-898.

Canales, et al., "A Wide Input Voltage and Load Output Variations Fixed-Frequency ZVS DC/DC LLC Resonant Converter for High-Power Applications", IEEE 37th IAS Annual Meeting Conference Record, vol. 4, 2002, pp. 2306-2313.

Corradini et al., "Zero Voltage Switching Technique for Bi-Directional DC/DC Converters", Energy Conversion Congress and Exposition (ECCE), 2011 IEEE; Issue Date: Sep. 17-22, 2011, pp. 2215-2222.

Doncker et al., "The Auxiliary Resonant Commutated Pole Converter", IAS, 1990 IEEE; pp. 1228-1235.

* cited by examiner

MULTIPHASE POWER CONVERTERS INVOLVING CONTROLLABLE INDUCTORS

BACKGROUND

The present invention relates to power converters, and more specifically, to power converters driving controllable inductors.

Converters using linearly controllable inductors rely on magnetic structures such as, for example, a double E-core 100 as shown in FIG. 1 having a main coil 102 bound around a gapped center leg of the core 100 and two series connected auxiliary coils 104 with the same number of turns wound around outlying legs. Two main windings (not shown) may be wound on each side of the air gap to reduce wire losses caused by fringing flux. The auxiliary coils generate flux in the same direction in the outer legs and in the opposite direction in the center leg. Flux cancellation in the center leg results in no net flux in the main coil. Neglecting non-linear effects, the coupling between the main and series connected auxiliary winding approaches zero.

Previous methods for generating control current include both linear and switch-mode power circuits that generate current in the control winding of the inductor.

SUMMARY

According to one embodiment of the present invention, a multiphase inductor includes a first core, a second core, a third core, a fourth core, a center leg partially defined by a portion of the first core, a portion of the second core, a portion of the third core, and a portion of the fourth core, a first outer leg partially defined by a second portion of the first core, a second outer leg partially defined by a second portion of the second core, a third outer leg partially defined by a second portion of the third core, a fourth outer leg partially defined by a second portion of the fourth core, a main winding wound around a portion of the center leg, a first control winding wound around a portion of the first leg, a second control winding wound around a portion of the second leg, a third control winding wound around a portion of the third leg, and a fourth control winding wound around a portion of the fourth leg.

According to another embodiment of the present invention, a method for reducing ripple current in a multi-phase inductor includes fabricating a multi-phase inductor having a core winding portion and two pairs of auxiliary windings, designating a first pair of auxiliary windings that are 180° out of phase, and coupling the first pair of windings with a first pair of opposing plates such that the first pair of opposing plates are operative to reduce the relative ripple current induced by the first pair of auxiliary windings into a second pair of windings in the multi-phase inductor.

According to yet another embodiment of the present invention, a controllable inductor system includes a multiphase inductor comprising a central winding, a first control winding, and a second control winding, and a control portion comprising a first control logic portion operative to receive a signal indicative of a current of the first control winding and a signal indicative of a current of the sum of the first control winding and the second control winding and modulate a first pulse width modulated signal to responsively control a first transistor connected to the first control winding, and a second control logic portion operative to receive the signal indicative of the current of the first control winding and a signal indicative of a current of the sum of the first control winding and the second control winding and modulate a second pulse width modulated signal to responsively control a second transistor connected to the second control winding.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As discussed above, previous methods for generating control current include both linear and switch-mode power circuits that generate current in the control winding of the inductor. The linear circuit provides fast transient response and nearly zero ripple current while sacrificing efficiency. The single-phase buck converter provides high efficiency; however, if the buck converter operates in continuous conduction mode with low ripple, the large-signal response is long. On the other hand, if the buck converter operates in discontinuous conduction mode, the buck converter exhibits a fast response; however, the control current ripple is undesirably high.

Figure 1:
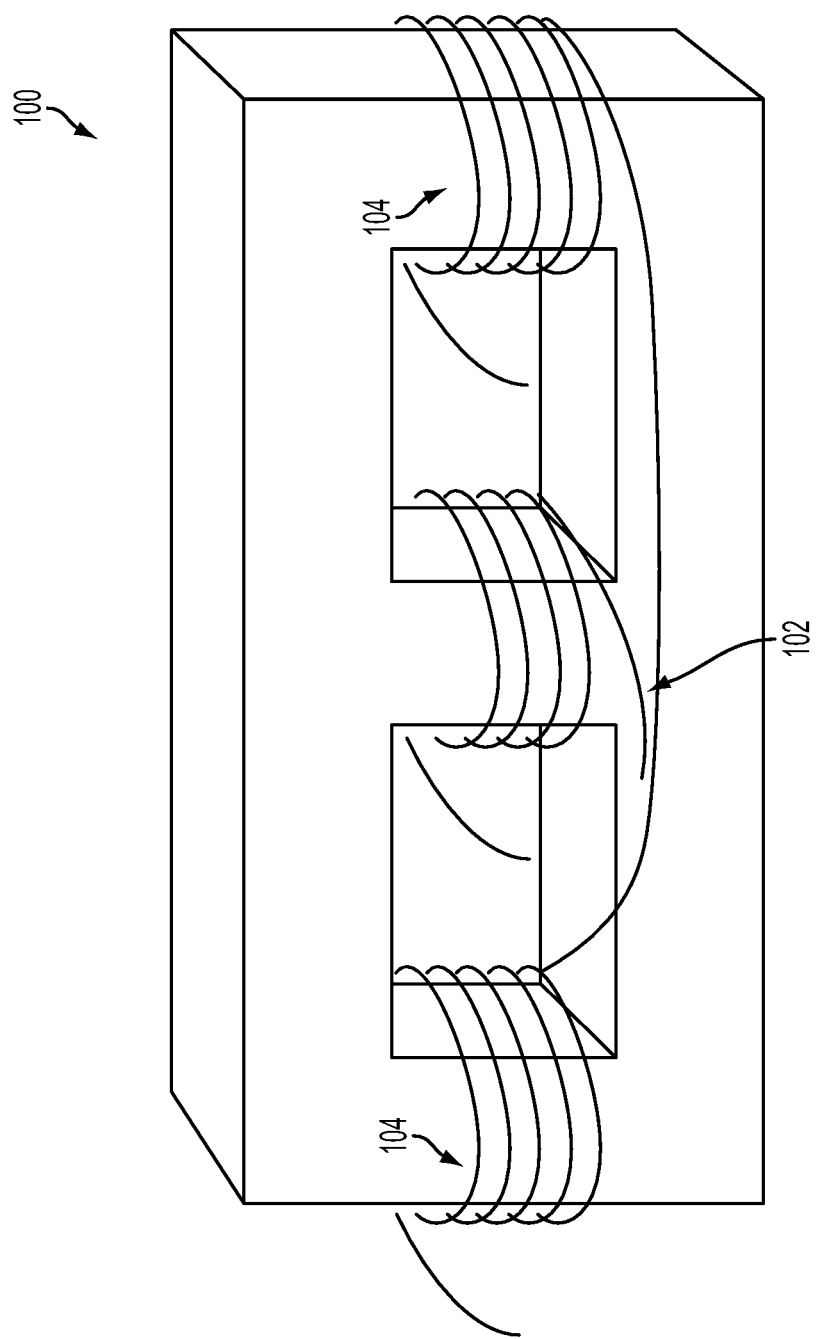
FIG. 1 illustrates a prior art example of a double E-core inductor.
Figure 2:
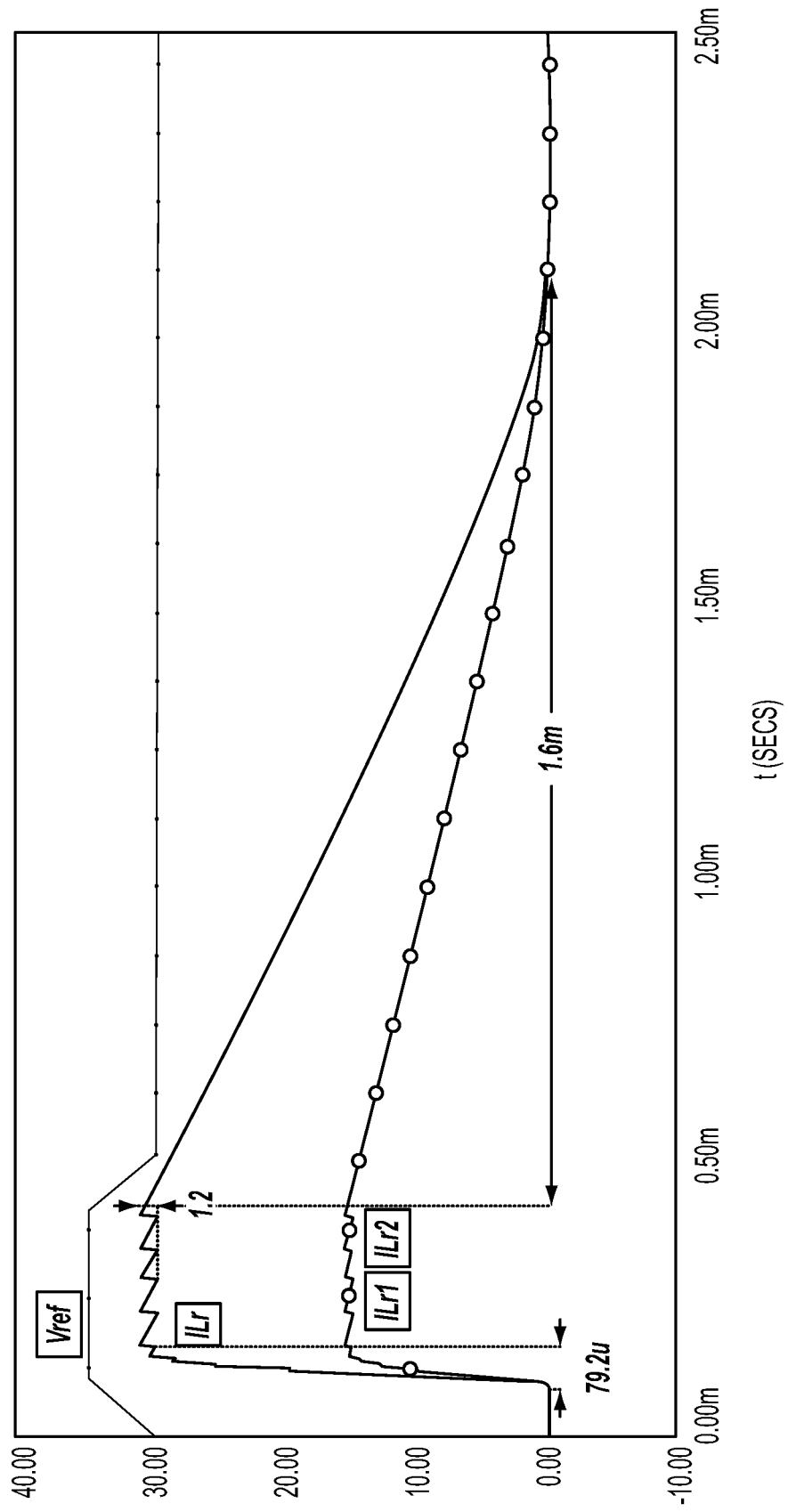
FIG. 2 illustrates a graphical representation of the dynamic response of a single-phase buck converter for inductor control.

FIG. 2 illustrates a graphical representation of the dynamic response of a single-phase buck converter for inductor control. The topology is single-quadrant. (i.e., the topology applies only positive voltage and positive current to the series connected control windings in FIG. 1.) The graph includes a trapezoidal reference signal with a 100 microsecond (μs) rising edge, a 300 μs flat section and a 100 μs falling edge applied to the amplifier. The control current ILr1 quickly builds up and maintains a steady state value. However, because the converter cannot reverse voltage across the control winding, the current fails to follow the falling edge of the reference signal, and thus fails to provide a fast dynamic response.

Figure 3:
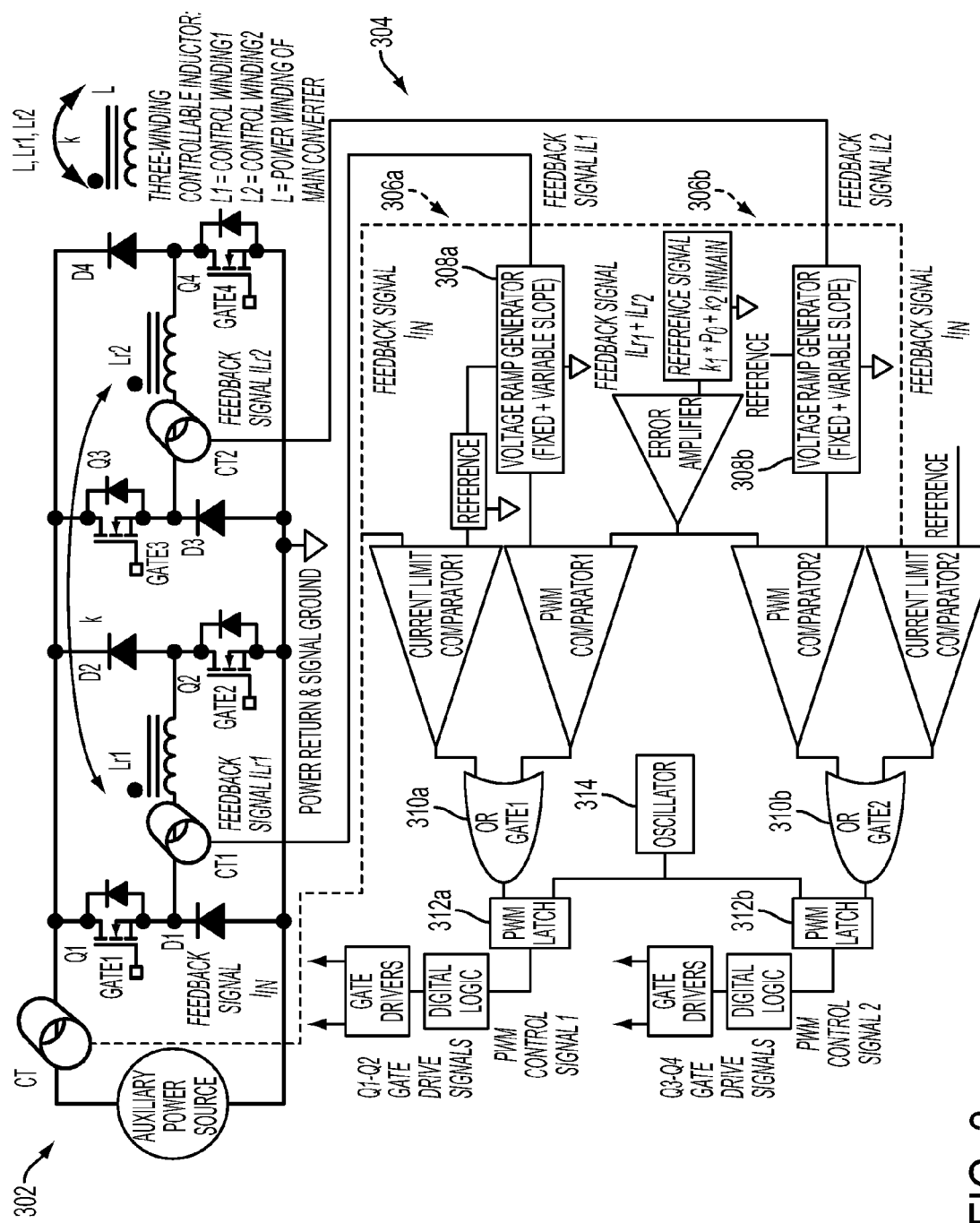
FIG. 3 illustrates an exemplary embodiment of a two-transistor forward converter topology.
Figure 10:
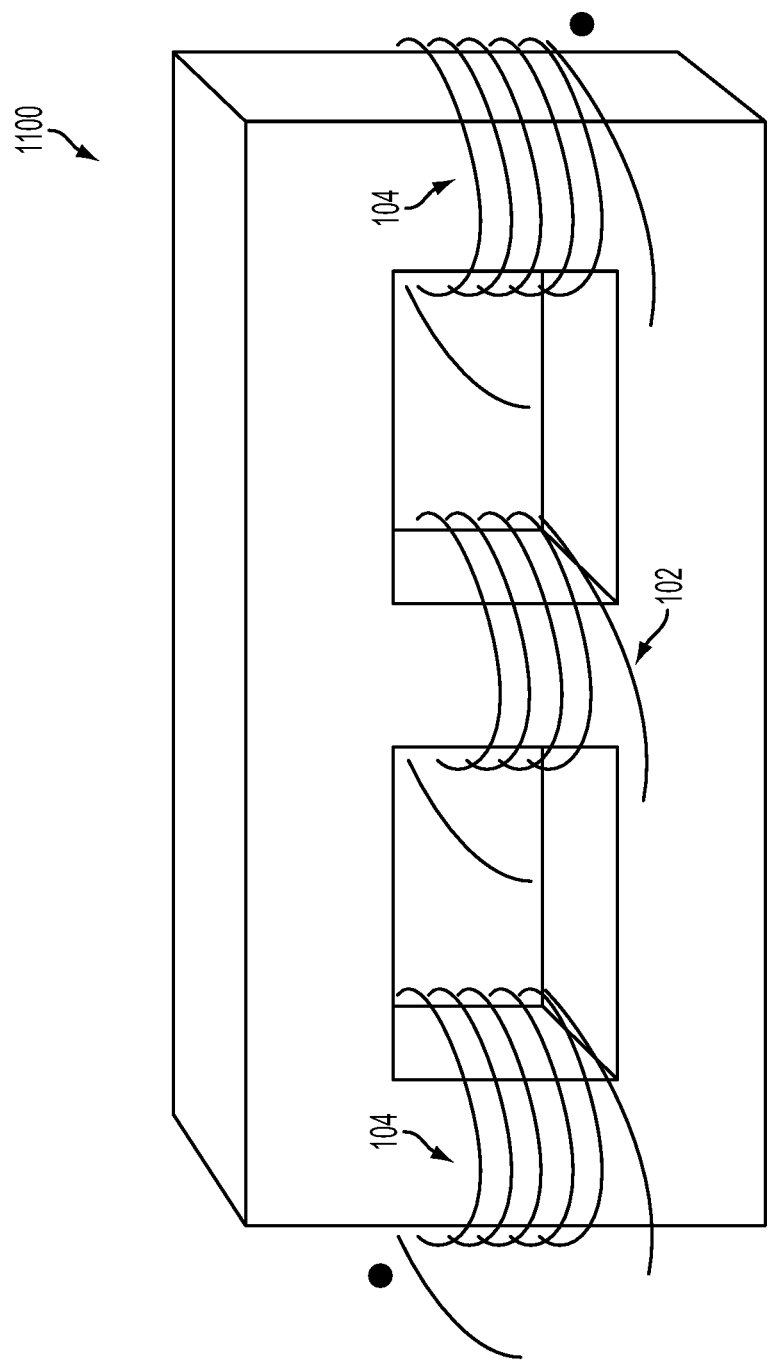
FIG. 10 illustrates an exemplary embodiment of a double E-core two phase inductor.

FIG. 3 illustrates an exemplary embodiment of two-transistor forward converter topology 300 that includes an auxiliary converter portion 302 and a pulse width modulation (PMW) controller portion 304 and the controllable inductor in FIG. 10. FIG. 10 illustrates an exemplary embodiment of a double E-core two phase inductor 1100. Unlike the auxiliary coils 104 in FIG. 1, the auxiliary coils 104 in FIG. 10 are not connected in series.

In this regard, the input source with a current sensor CT and power components Q1, Q2 D1, D2, CT1 and Lr1 associated with phase 1 and power components Q3, Q4 D3, D4, CT2 and Lr2 associated with phase 2. Though the illustrated embodiment includes the diodes D1-D4, alternate embodiments may include transistors (not shown) instead of the diodes D1-D4. The controller portion 304 includes a first logic portion 306a and a second logic portion 306b that receive feedback signals ILr1 and 11r2 that are indicative of the currents of the Lr1 and Lr2 control windings respectively. The logic portion 306a receives the signal ILr1 at a voltage ramp generator 308a and a signal indicative of the sum of ILr1 and ILr2. The signals are compared and pass through a logic gate 310a to a PMW latch 312a that is connected to an oscillator 314. The signal from the PMW latch 312a is used to drive the gate of transistors Q1 and Q2. The second logic portion 306b is arranged and operates in a similar manner.

In operation, the two phases are shifted in time by 180°, i.e., phase 2 lags phase 1 by 5 microseconds. With each phase switching at 100 kHz, the embodiment in such a configuration results in an output current with the equivalent ripple frequency of 200 kHz. The topology 300 delivers energy to the inductors during the "ON" time interval of the transistors. During the "OFF" time interval of the transistors, the inductors return energy to the input source. During the start-up or current build-up the "ON" time interval considerable exceeds the "OFF" time interval; conversely, during the current decay the "OFF" time interval considerable exceeds the "ON" time interval.

Figure 4:
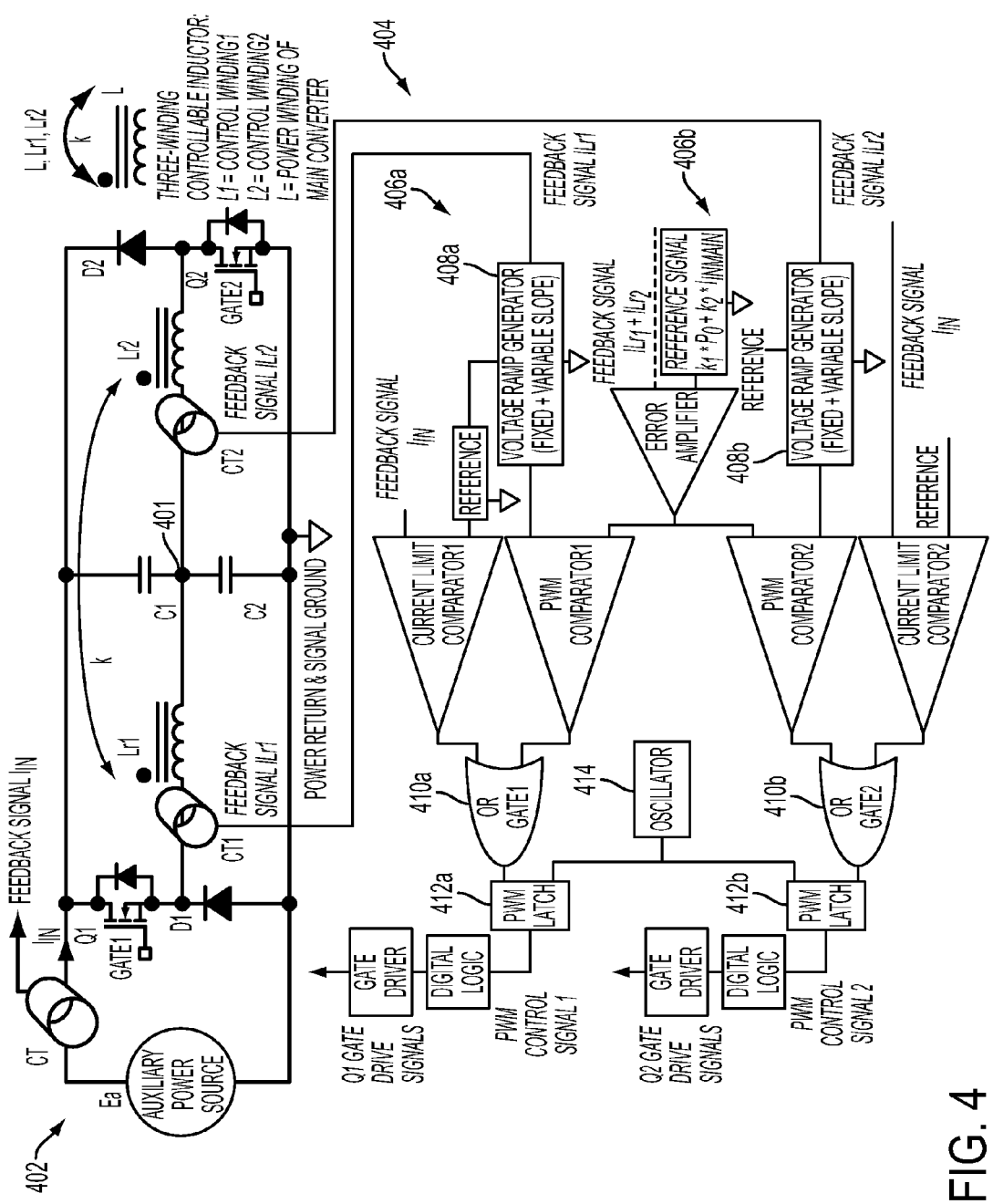
FIG. 4 illustrates an exemplary embodiment of a two quadrant single stage two-phase converter topology.
Figure 8:
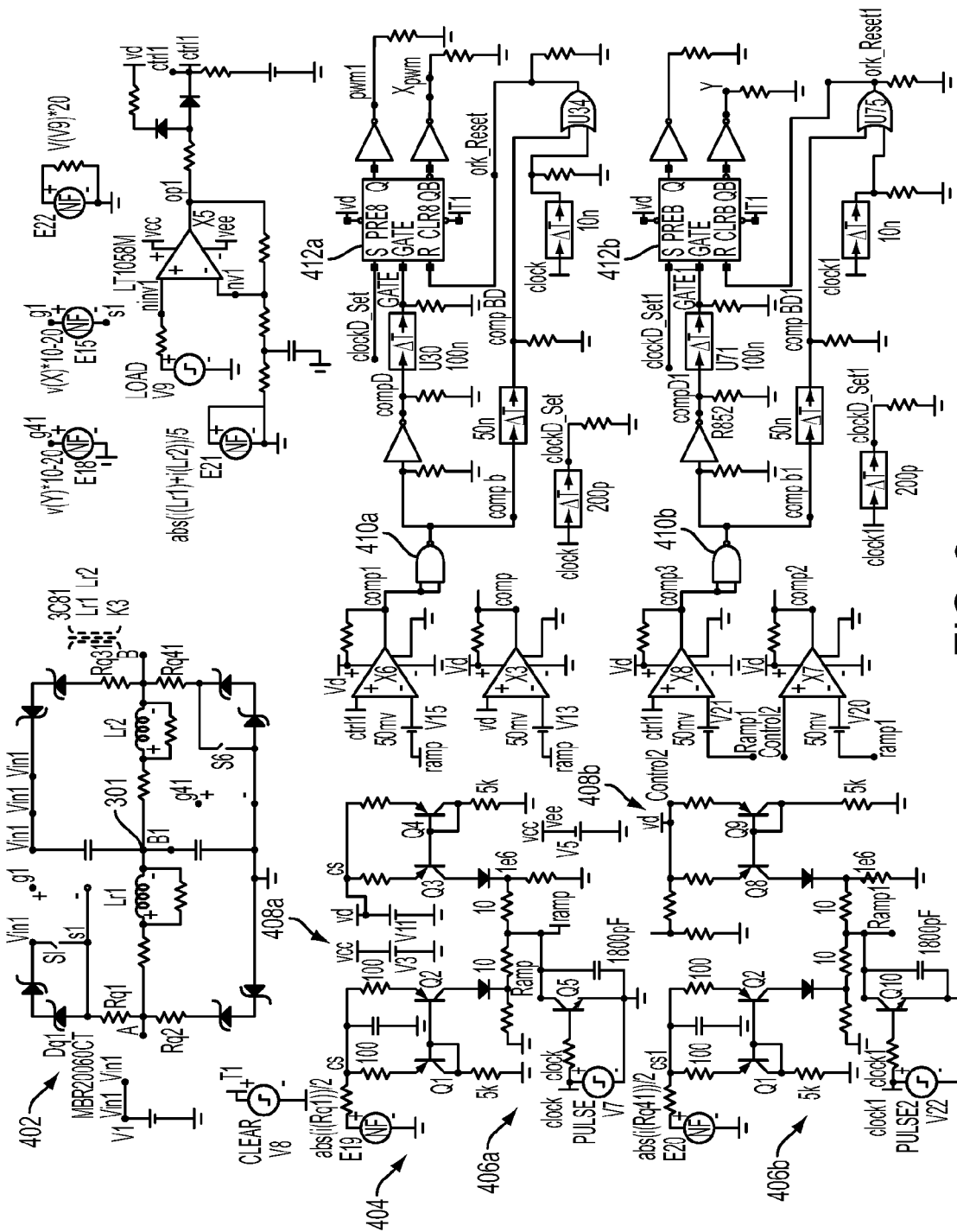
FIG. 8 illustrates a detailed circuit diagram similar to the embodiment of FIG. 4.

FIG. 4 illustrates an exemplary embodiment of a two quadrant single stage two-phase converter topology 400 that includes an auxiliary converter portion 402, a pulse width modulation (PMW) controller portion 404, and the controllable inductor in FIG. 10. In this regard, the input source and is center tapped at node 401 with capacitors C1 and C2 with power components Q1, D1, CT1 and Lr1 associated with phase 1 and power components Q2, D2, CT2 and Lr2 associated with phase 2. Though the illustrated embodiment includes the diodes D1 and D2, alternate embodiments may include transistors (not shown) instead of the diodes D1 and D2. The controller portion 404 includes a first logic portion 406a and a second logic portion 406b that receive feedback signals ILr1 and ILr2 that are indicative of the currents of the Lr1 and Lr2 control windings respectively. The logic portion 406a receives the signal ILr1 at a voltage ramp generator 408a and a signal indicative of the sum of ILr1 and ILr2. The signals are compared and pass through a logic gate 410a to a PMW latch 412a that is connected to an oscillator 414. The signal from the PMW latch 412a is used to drive the gate of the transistor Q1. The second logic portion 406b is arranged and operates in a similar manner. A detailed circuit diagram similar to the embodiment of FIG. 4 is illustrated in FIG. 8, described below.

In operation, the two phases are shifted in time by 180°, i.e., phase 2 lags phase 1 by 5 microseconds. With each phase switching at 100 kHz, the embodiment in such a configuration results in an output current with the equivalent ripple frequency of 200 kHz. The topology 400 delivers energy to the inductors during the "ON" time interval of the transistors with a 50% reduction in the number of semiconductor power switches compared to topology 300. During the "OFF" time interval of the transistors, the inductors return energy to the input source. During the start-up or current build-up the "ON" time interval considerable exceeds the "OFF" time interval; conversely, during the current decay the "OFF" time interval considerable exceeds the "ON" time interval.

Figure 5:
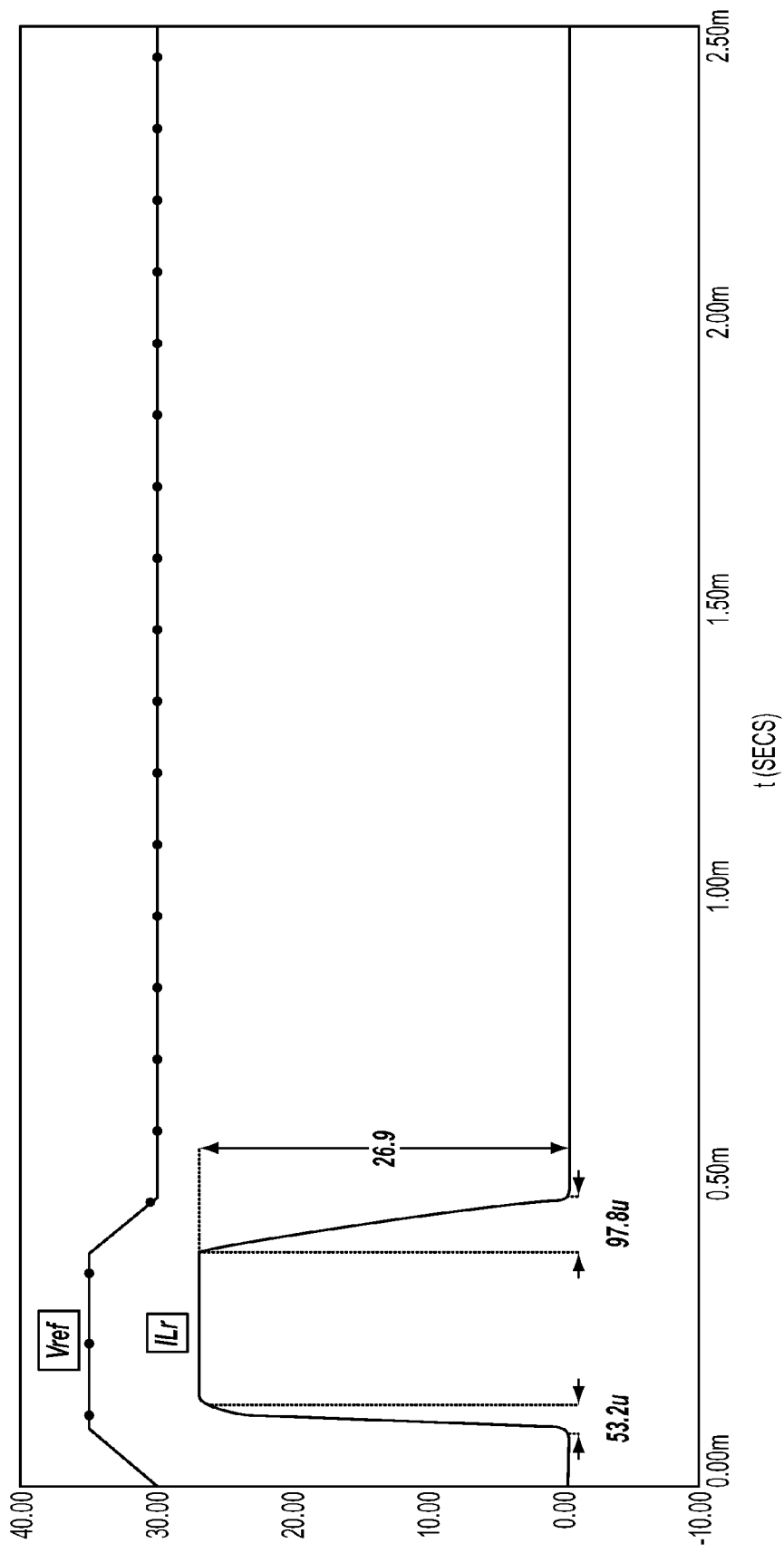
FIG. 5 illustrates simulated waveforms over a 2.5 millisecond (ms) time interval for the topology of FIG. 4.

FIG. 5 illustrates simulated waveforms over a 2.5 ms time interval for the topology 400 (of FIG. 4). Compared to the output of FIG. 2 described above, the resultant control current ripple is reduced and the speed of the response of the trailing edge of the ILr signal is increased.

Figure 6A:
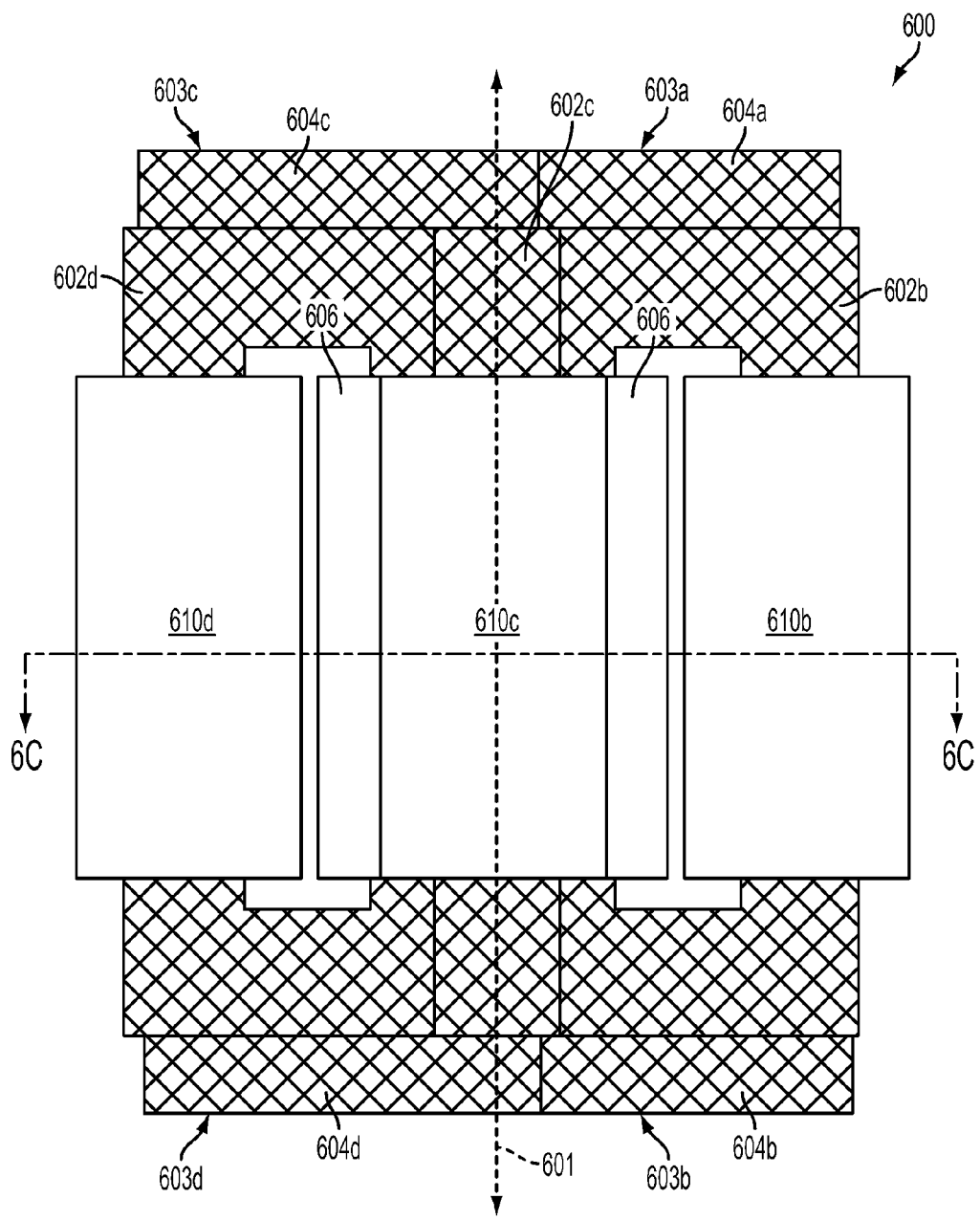
FIG. 6A illustrates a side view of an exemplary embodiment of a four-phase inductor.
Figure 6B:
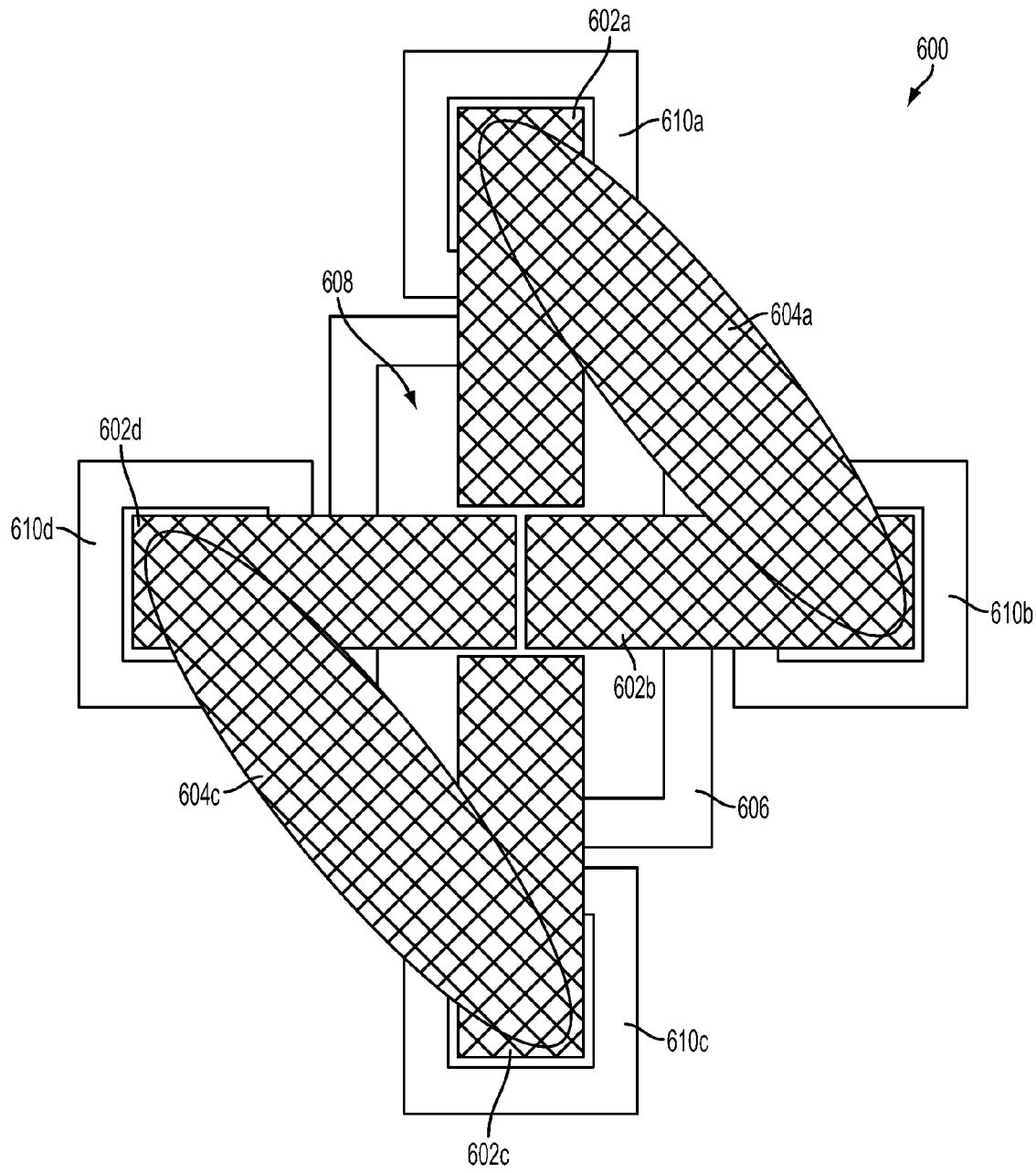
FIG. 6B illustrates a top view of the exemplary embodiment of a four-phase inductor of FIG. 6A.
Figure 6C:
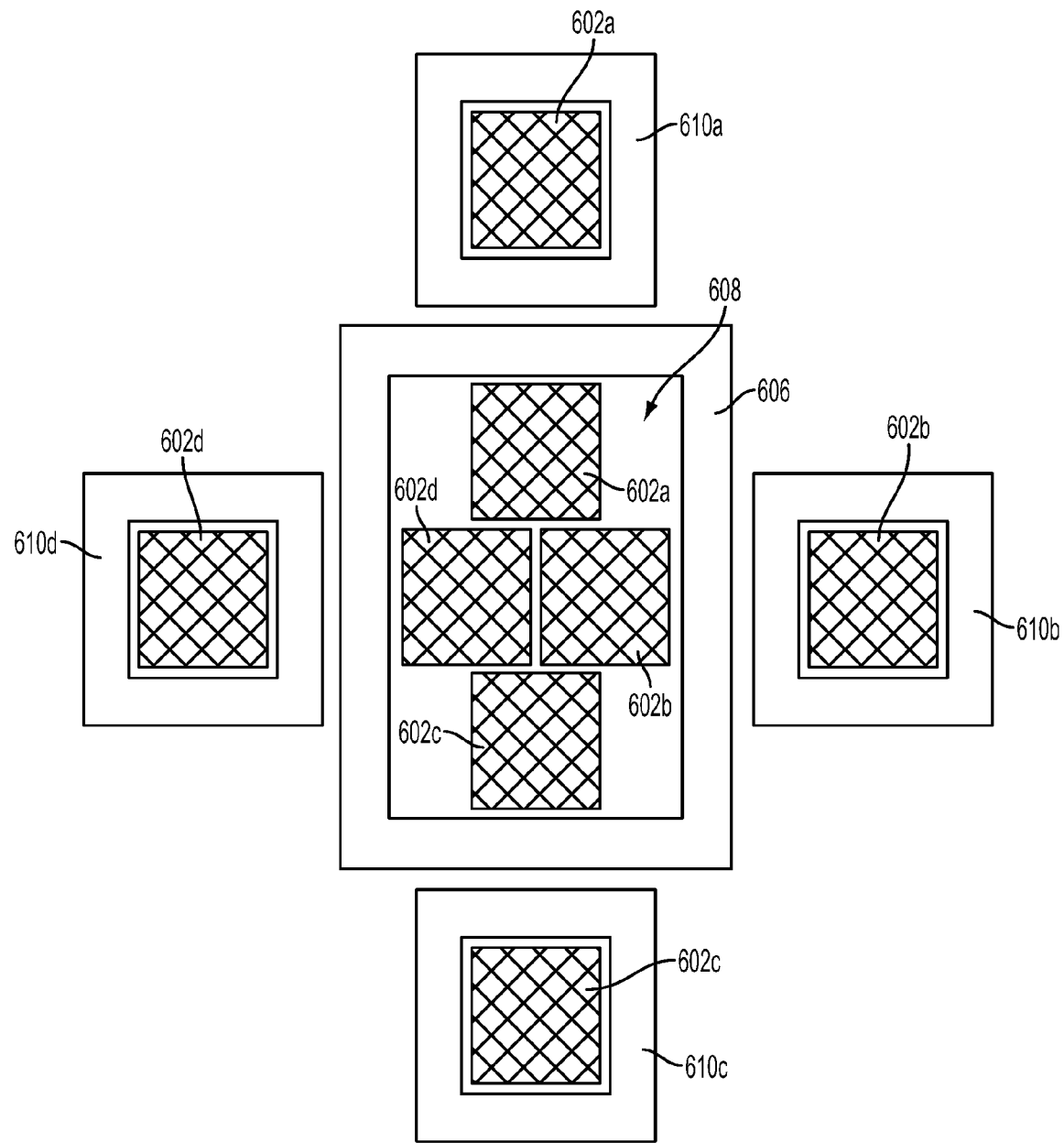
FIG. 6C illustrates a cross-sectional view of the exemplary embodiment of a four-phase inductor along the line 6C of FIG. 6A.

FIGS. 6A-6C illustrate a side view, a top view, and cutaway view (along the line 6C of FIG. 6A) respectively of an exemplary embodiment of a four-phase inductor 600. The inductor 600 includes a five-legged composite magnetic core having four ferrous dual cores 602a-d and four ferrous plate cores 604a-d. Though the dual cores 602a-d are shown having a C-shape, the dual cores 602a-d may be shaped in any variety of appropriate shapes, such, as, for example, a continuous ring, a ring having a gap, or any other geometric shape operative to define a dual core. Though the plate cores 604a-d are shown having an elliptical shape, a variety of other shapes such as, for example, rectangular may be provided in alternate embodiments. Alternate embodiments may also not include the planar cores 604a-d if desired. A main winding 606 is wound around a center leg 608, and control windings 610a-d are wound around outer legs 602a-d of the composite core. The main winding and center leg 608 define a longitudinal axis 601. Portions of the dual core 602a-d extend radially from the axis 601. The plate cores 604a-d are arranged such that the surfaces 603a-d of the plate cores 604a-d are substantially perpendicular to the axis 601; and the plate cores 604a and 604c are arranged substantially co-planar to each other, while the plate cores 604b and 604d are arranged substantially co-planar to each other. The plate cores 604a and 604c define planar surfaces 603 that are substantially parallel to the planar surfaces 603 defined by the plate cores 604b and 604d.

The inductor 600 may be fabricated using any appropriate fabrication methods. In this regard, the four ferrous dual cores 602a-d and four ferrous plate cores 604a-d may be fabricated with ferrous materials using, machining, casting, stamping or other similar fabrication methods. The windings may be fabricated using suitable winding and assembly processes including printed-circuit board winding, hand winding, or the use of winding machinery.

Figure 7:
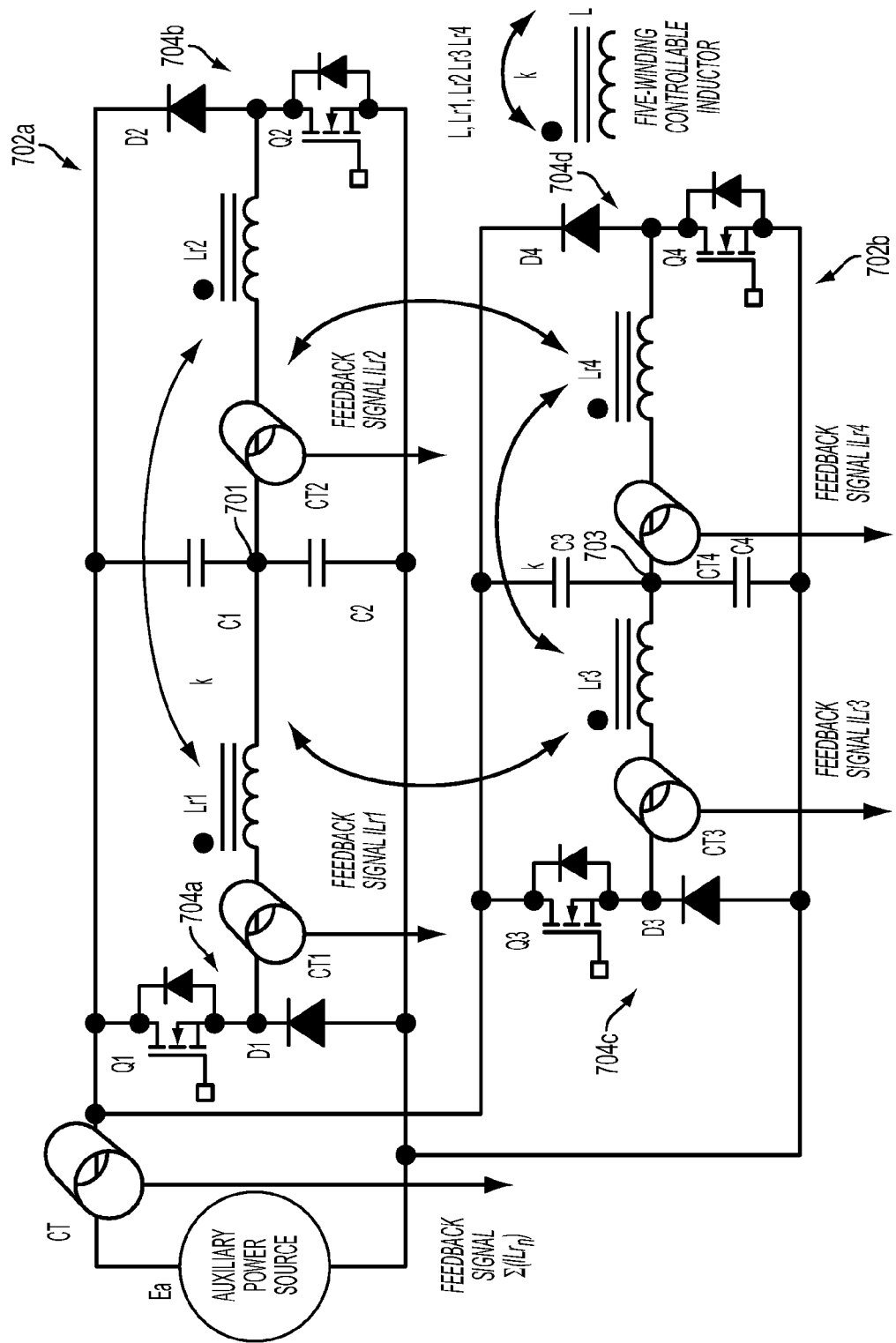
FIG. 7 illustrates an exemplary embodiment of a four-phase converter.

FIG. 7 illustrates an exemplary embodiment of a four-phase converter 700 that includes a four-phase inductor similar to the inductor 600 described above. In this regard, the converter 700 includes two two-phase converter arrangements 702a and 702b that use a center tapped voltage applied at nodes 701 and 703 that is implemented using two series-connected capacitors (C1 and C2; and C3 and C4); however, alternate embodiments may use two power sources to generate the center tapped input. If the series-connected capacitors are used, their voltage balance is ensured using the average current-mode control or another method. Each of the control windings 610a-d (of FIG. 6) correspond to the windings Lr1-Lr4 and are connected to a corresponding center tapped voltage and transistor-diode arrangements 704a-d that each include a diode (D) and a transistor (Q). Though the illustrated embodiment includes diodes D, alternate embodiments may include transistors (not shown) instead of the diodes D. Current sensing devices CT1-CT4 sense the currents of the control winding 610a-d and output respective feedback signals; current sense device CT sense the input current to the converter to protect against an over-current condition. Alternatively, the overload current sensing devices may be connected in series with capacitors C1-C4 or in series with transistors Q1-Q4. Furthermore, connecting overload sensing devices in series with the input source allows sensing DC component of the source current critical for protecting the converter and the overall system against semiconductor failures. Many current-sense devices include current-sense resistors, current-sense transformers, and Hall-effect sensors. The control of the converter 700 is accomplished by dividing the cycle time by the number of phases and the clock frequency is multiplied by the number of phases using a PWM controller that is similar to the PWM controller described above in FIG. 4.

The multiphase PWM controller includes components common to all phases: a voltage reference, a multi-phase clock pulse generator 414, and an error amplifier. Each phase (channel) of the PWM controller includes a composite-slope ramp generator summing up a fixed and a variable slope. The fixed slope is derived from the voltage reference and the variable slope is derived from the inductor current. This circuit implements the pulse-by-pulse average current mode control that in effect removes poles associated with inductors from the converter closed-loop transfer function. Also, it ensures voltage balance across capacitors C1 and C2 by equalizing their charge over positive and negative half cycles.

FIG. 8 illustrates a detailed circuit diagram similar to the embodiment of FIG. 4 (described above). In this regard, FIG. 8 includes an exemplary embodiment of the auxiliary converter portion 402 and a pulse width modulation (PMW) controller portion 404.

Each phase of the PWM controller also includes such elements as a PWM comparator, a latch, logic gates and gate drivers. The two-phase controller shown in FIG. 4 may be expanded to any desired number of phases by adding the appropriate number of channels.

The error amplifier generates an error signal as the difference between the feedback signal and the reference (control) signal. The PWM comparator compares the error signal with the composite ramp and generates the pulse-width modulated pulse. The latch ensures that only one PWM pulse is generated during a given half-cycle of the clock frequency. The gate drivers amplify PWM signals, isolate them from the controller ground and interface with the power stage transistors.

The closed-loop controller operates as follows. When the converter is turned on, its output (inductor) current starts ramping up and does not immediately reach the steady state value. During the current build-up interval, the reference (control) signal at the input of the error amplifier exceeds the feedback signal and the error signal at the output of the error amplifier is at its high limit (close to the positive rail of the bias power supply). The large error signal applied to the PWM comparator produces long PWM pulses during the startup time interval. This results in large duty cycles and a speedy ramp up of the converter current. Once the converter reaches the steady state, the closed-loop controller adjusts the duty cycle as needed to maintain the converter's operating point.

Figure 9:
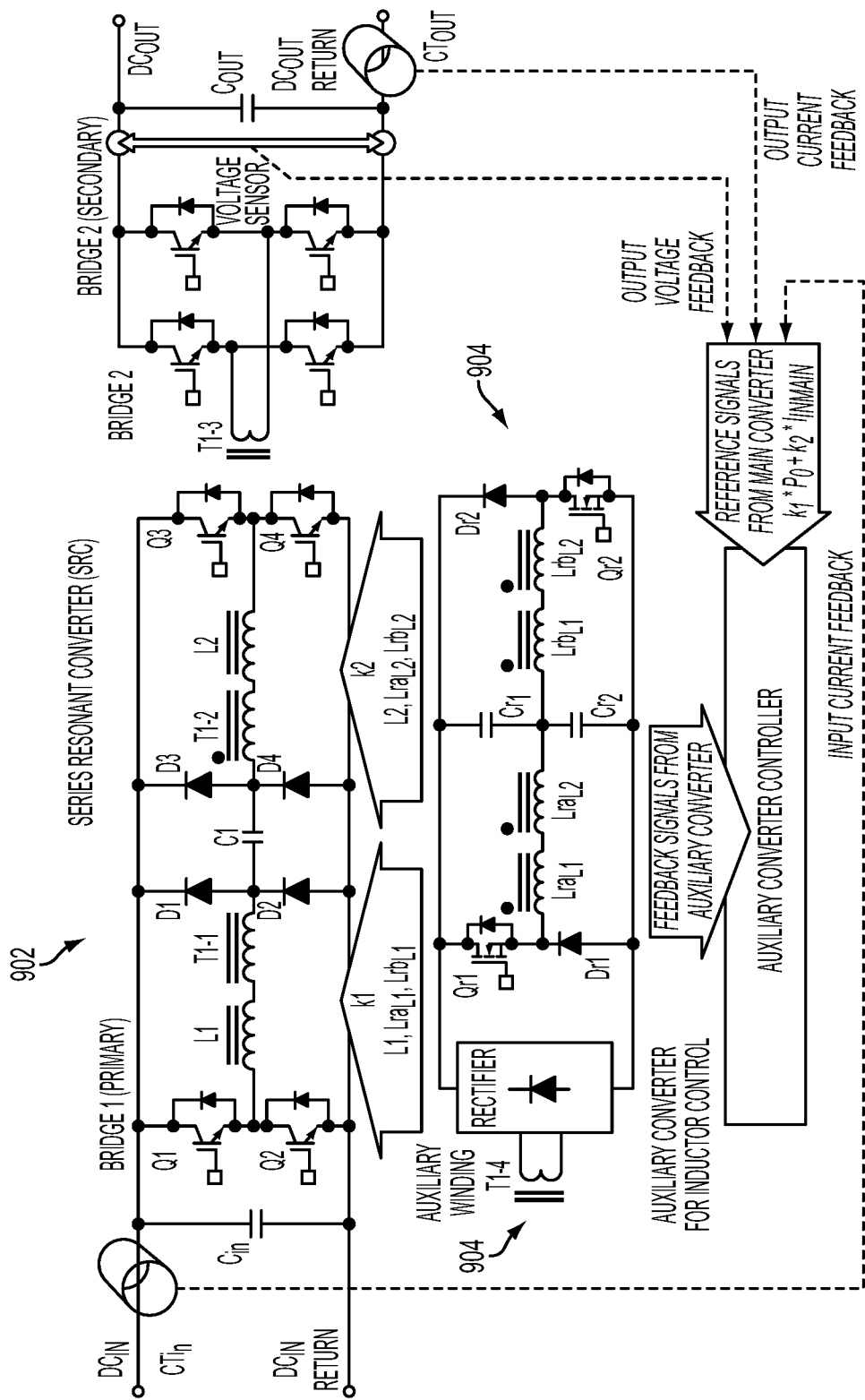
FIG. 9 illustrates a series resonant converter with a clamped capacitor voltage and a two-phase auxiliary converter.

The proposed inductor driver topology and control method may be used in a wide range of converters and systems. FIG. 9 illustrates a series resonant converter (SRC) 902 with clamped capacitor voltage with the Two-Phase auxiliary converter 904. Because the SRC 902 has two inductors L1 and L2, the auxiliary converter 904 drives two pairs of windings of two independent magnetics (L1 and L2). An auxiliary winding 904 of the SRC power transformer feeds the auxiliary converter 904. When the SRC 902 load is reduced, the inductors' value is increased to maintain ZVS. Regardless of the load, when the line voltage is increased, the inductors value is increased as well reducing the reactive power processed by the converter 902 at the high input line. The reference signal controlling the inductors equals:

$$V\text{ref} = \Sigma_1^n \text{var}$$

where var is a scaled main powerconverter variable that is significantly affected by the value of the inductor.

For example, the converter shown in FIG. 4 uses scaled variables $P_o$ and $I_{inmain}$:

$$V\text{ref} = k_1 * P_o + k_2 * I_{inmain} \text{ where}$$

$P_o$=output power
$I_{inmain}$=input current
$k_1$=output power scaling factor
$k_2$=input current scaling factor.

Though the embodiments described above in FIGS. 5-9 include four-phase inductors and associated controls, alternate embodiments may include 2n phases arranged and controlled in a similar manner. For example, an inductor may include six phases where six sets of control windings are arranged in a similar manner as the inductor 600 described above. A six phase converter would be similar to the converter 700 described above with three two-phase converter arrangements similar to the two two-phase converter arrangements 702.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A multiphase inductor comprising:
a first core;
a second core;
a third core;
a fourth core;
a center leg partially defined by a portion of the first core, a portion of the second core, a portion of the third core, and a portion of the fourth core;
a first outer leg partially defined by a second portion of the first core;
a second outer leg partially defined by a second portion of the second core;
a third outer leg partially defined by a second portion of the third core;
a fourth outer leg partially defined by a second portion of the fourth core;
a main winding wound around a portion of the center leg, the main winding and center leg defining a longitudinal axis, and the cores extending radially from the longitudinal axis such that the first, second, third and fourth cores are disposed about the center leg at orthogonal angles with respect to one another;
a first control winding wound around a portion of the first leg;
a second control winding wound around a portion of the second leg;
a third control winding wound around a portion of the third leg; and
a fourth control winding wound around a portion of the fourth leg;
an elliptically shaped first plate core arranged in contact with a top surface of the first outer leg and a top surface of the second outer leg, the elliptically shaped first plate core spaced apart from the third outer leg and fourth outer leg;
an elliptically shaped second plate core arranged in contact with a top surface of the third outer leg and a top surface the fourth outer leg, the elliptically shaped second plate core spaced apart from the first outer leg and second outer leg;
an elliptically shaped third plate core arranged in contact with a bottom surface of the first outer leg and a bottom surface of the second outer leg, the elliptically shaped third plate core spaced apart from the third outer leg and fourth outer leg; and
an elliptically shaped fourth plate core arranged in contact with a bottom surface of the third outer leg and a bottom surface of the fourth outer leg, the elliptically shaped fourth plate core spaced apart from the first outer leg and second outer leg.

2. The inductor of claim 1, wherein the elliptically shaped first plate core is arranged substantially coplanar with the elliptically shaped second plate core.

3. The inductor of claim 1, wherein the elliptically shaped third plate core is arranged substantially coplanar with the elliptically shaped fourth plate core.

4. The inductor of claim 1, wherein the elliptically shaped first plate core is arranged substantially parallel to the elliptically shaped third plate core.

5. The inductor of claim 1, wherein the elliptically shaped fourth plate core is arranged substantially parallel to the elliptically shaped second plate core.

6. The inductor of claim 1, wherein the first, second, third and fourth cores are C-shaped.

7. A multiphase inductor comprising:
a first dual core;
a second dual core;
a third dual core;
a fourth dual core;
a center leg partially defined by a first portion of the first dual core, a first portion of the second dual core, a first portion of the third dual core, and a first portion of the fourth dual core, wherein the first portions of the first, second, third and fourth dual cores are physically spaced apart from one another;
a first outer leg partially defined by a second portion of the first dual core;
a second outer leg partially defined by a second portion of the second dual core;
a third outer leg partially defined by a second portion of the third dual core;
a fourth outer leg partially defined by a second portion of the fourth dual core;
a main winding wound around a portion of the center leg, the main winding and center leg defining a longitudinal axis, and the cores extending radially from the longitudinal axis such that the first, second, third and fourth cores are disposed about the center leg at orthogonal angles with respect to one another;
a first control winding wound around a portion of the first leg;
a second control winding wound around a portion of the second leg;
a third control winding wound around a portion of the third leg; and
a fourth control winding wound around a portion of the fourth leg,
an elliptically shaped first plate core arranged in contact with a top surface of the first outer leg and a top surface of the second outer leg, the elliptically shaped first plate core spaced apart from the third outer leg and fourth outer leg;
an elliptically shaped second plate core arranged in contact with a top surface of the third outer leg and a top surface the fourth outer leg, the elliptically shaped second plate core spaced apart from the first outer leg and second outer leg;
an elliptically shaped third plate core arranged in contact with a bottom surface of the first outer leg and a bottom surface of the second outer leg, the elliptically shaped third plate core spaced apart from the third outer leg and fourth outer leg; and
an elliptically shaped fourth plate core arranged in contact with a bottom surface of the third outer leg and a bottom surface of the fourth outer leg, the elliptically shaped fourth plate core spaced apart from the first outer leg and second outer leg.

* * * * *